United States Patent [19]

Priepke et al.

[11] 4,439,218
[45] Mar. 27, 1984

[54] SCREEN CLEANING MEANS

[75] Inventors: Edward H. Priepke, Lancaster; Ronald L. McAllister, New Holland, both of Pa.

[73] Assignee: Sperry Corporation, New Holland, Pa.

[21] Appl. No.: 395,564

[22] Filed: Jul. 6, 1982

[51] Int. Cl.$^3$ ............................................. B01D 46/10
[52] U.S. Cl. ........................................ 55/288; 55/268; 55/297; 55/385 B
[58] Field of Search ................. 55/268, 288, 295, 296, 55/297, 385 B

[56] References Cited

U.S. PATENT DOCUMENTS

| | | |
|---|---|---|
| 2,661,810 | 12/1953 | Heth . |
| 2,886,016 | 5/1959 | Ashton ............................. 55/288 X |
| 3,190,817 | 6/1965 | Neugebauer et al. ............. 55/295 X |
| 3,404,514 | 10/1968 | Fergason ........................... 55/295 |
| 3,475,883 | 11/1969 | Sullivan . |
| 3,487,623 | 1/1970 | Easter ................................. 55/296 |
| 4,057,105 | 11/1977 | Bailey ............................... 55/295 X |
| 4,153,436 | 5/1979 | Cozine et al. . |
| 4,233,040 | 11/1980 | Vogelaar et al. . |
| 4,276,066 | 6/1981 | Bly et al. ........................... 55/288 X |

FOREIGN PATENT DOCUMENTS 614754  2/1961  Canada ................................ 55/297

Primary Examiner—Kathleen J. Prunner
Attorney, Agent, or Firm—C. Hercus Just; Darrell F. Marouette; Frank A. Seemar

[57] ABSTRACT

Cleaning mechanism for a screen such as a radiator screen mounted adjacent an air-cooled radiator and air-circulating fan for a water-cooled engine to prevent debris from clogging the air passages of the radiator and including a frame supporting the screen as aforesaid, a motor driven shaft extending substantially centrally through the screen, transverse arms rotated by the shaft and having dislodging members in wiping relation to the air-inlet face of the screen, and baffle plates carried by the shaft for rotation relative to the air discharge face of the screen and in alignment with the arms and dislodging members to neutralize the suction effect of the air-circulating fan for the radiator and thereby permit debris dislodged by the members to fall by gravity from the screen.

3 Claims, 4 Drawing Figures

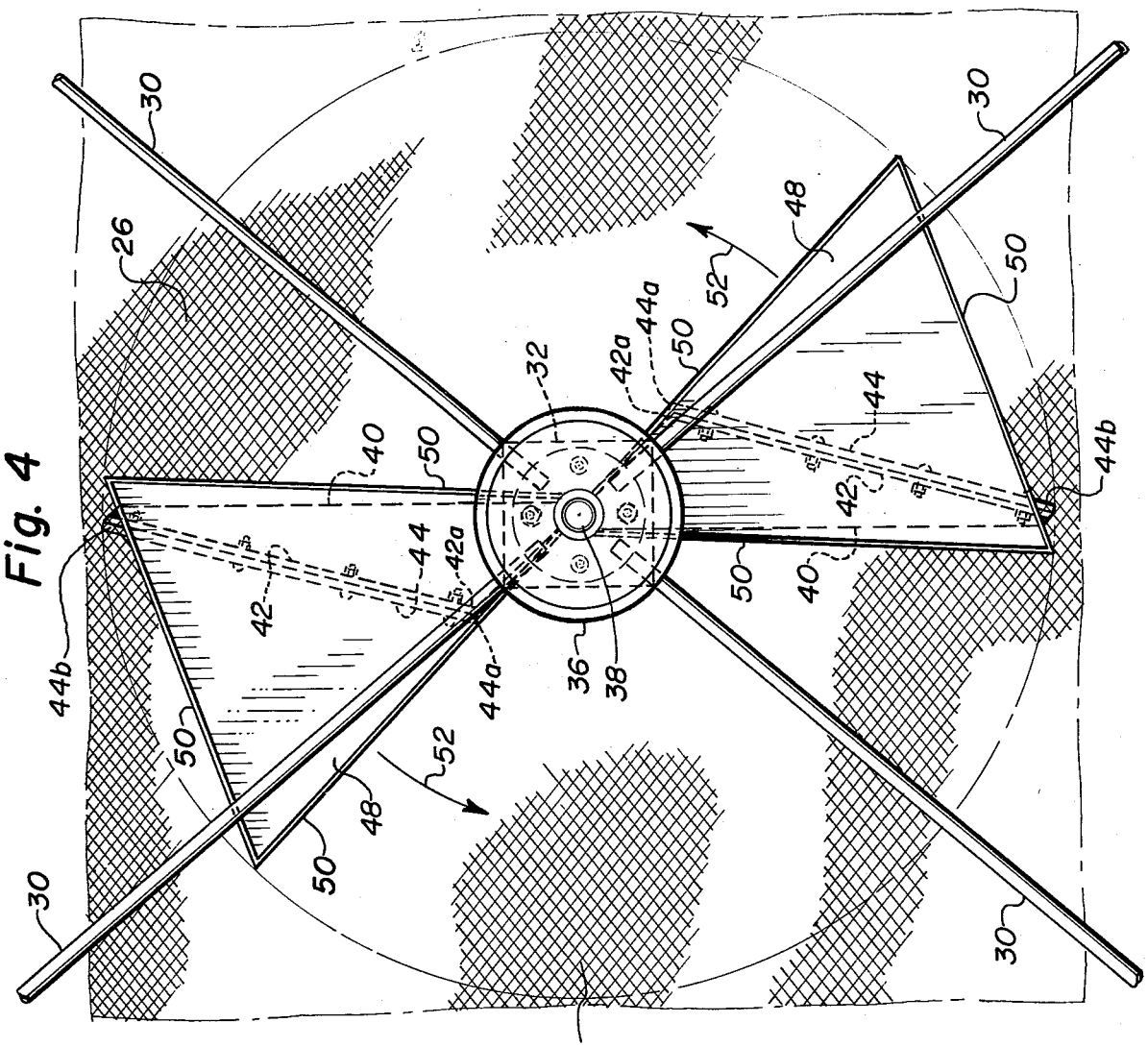
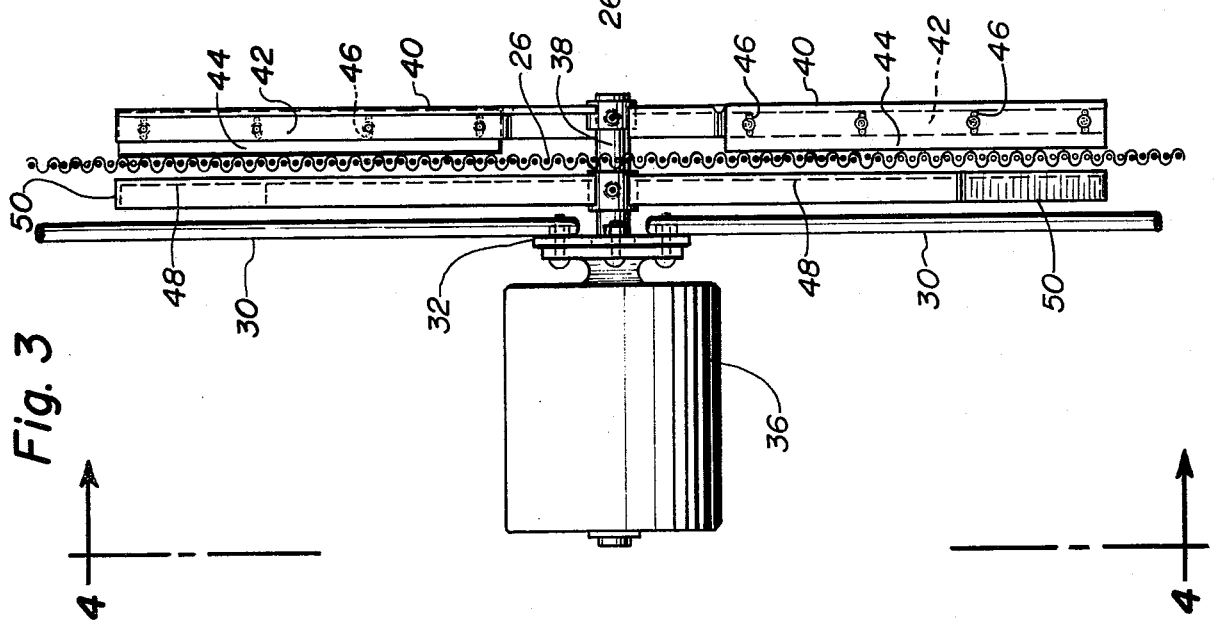

SCREEN CLEANING MEANS

BACKGROUND OF THE INVENTION

There are many types of machines which are powered by water-cooled engines operating in environments which present problems with respect to maintaining the air passages through the radiators for the cooling system clear of accumulations of debris. Earth moving machinery operating in dry, dusty atmospheres are faced with such a problem but, more particularly, harvesting equipment such as combines and forage harvesters which operate on crops especially are subjected to the clogging of the radiator air passages with chaff, leaves and other types of debris. Such accumulations of debris greatly minimize the efficiency of the cooling system. In certain climates and situations, insects such as locusts present a substantial problem relative to clogging the air passages of radiators of harvesting equipment, especially in view of the suction fans usually associated with such radiators to draw the ambient air through the air passages to cool the water or other cooling liquids in the cooling system for the engines.

Various attempts have been made in the past to minimize the foregoing difficulties, including the mounting of screens of different kinds over the air passages of radiators for the motors of the machines but, while this somewhat minimizes the entry of accumulating debris in the air passages of a radiator, it nevertheless presents the problem of cleaning the screens and in many circumstances, it is necessary to stop the machine and have an operator physically clean the screen of the accumulated debris. This interferes with the harvesting operation for obvious reasons and has resulted in the development of various devices to clean the screens associated with the radiators of liquid-cooled engines or motors, typical examples of which as follows.

U.S. Pat. No. 2,661,810 to Heth, dated Dec. 8, 1953, comprises a device attached to the inlet of an air conduit leading to a carburetor of a combustion engine for farm implements and includes a transverse screen on the upper end of a vertical air inlet pipe and the incoming air operates the veins on a rotary cleaning member which rotates to dislodge accumulated debris in the pores of the screen.

U.S. Pat. No. 3,475,883 to Sullivan, dated Nov. 4, 1969, pertains to a screen for the inlet to the radiator of an agricultural combine to prevent the inlet of dust and debris to the pores of the radiator and includes a pivoted pendulum-like baffle suspended by gravity from a central axis and adapted to form with respect to a surrounding rotating screen a so-called dead space where the suction of a fan is inapplicable to draw air through the screen and the theory of operation is that the baffle will form an area where dust and debris accumulated on the exterior of the lower portion of the path of travel of the rotary screen will permit at least some of the debris to fall by gravity therefrom and thus tend to keep the screen reasonably clean. Certain kinds of brush-type seals are also associated between the rim of the screen and the supporting frame therefor which is stationary.

U.S. Pat. No. 4,153,436 to Cozine et al, discloses a device similar to that of Sullivan and primarily differs therefrom by drive means which comprise an improvement over the drive means shown in the Sullivan patent.

U.S. Pat. No. 4,233,040 to Vogelaar et al, dated Nov. 11, 1980, pertains to a screen filter for a combine for purposes of keeping the cooling air inlet to an engine relatively free of accumulated debris by utilizing a rotating disc-like screen mounted over the air inlet and utilizing a duct which extends across the face of the disc-like screen from its center to the periphery and changes the direction of air and terminates with an open end adjacent the inlet side of the fan and thereby bypasses the radiator.

The present invention is directed to a very simple but highly effective means for cleaning a screen such as the type of screen associated with the inlet face of a water cooling radiator.

SUMMARY OF THE INVENTION

It is among the principle objects of the invention to provide a cleaning mechanism for a screen such as a radiator screen mounted adjacent an air-cooled radiator for a water-cooled engine and including a frame supporting the screen forwardly of the radiator and also a motor-driven shaft extending through the screen transversely and provided with arms rotated by the shaft with strips mounted on the arms in wiping relation to the air inlet face of the screen, and baffle plates carried by the shaft for rotation relative to the air discharge face of the screen and in alignment with the arms and strips to neutralize the suction effect of the air-circulating fan for the radiator and thereby permit debris dislodged by the strips to fall by gravity from the screen.

Another object of the invention is to dispose the ends of the arms which are connected to the shaft in laterally offset relationship to the shaft a limited distance, and the leading portions of the baffles in the direction of rotation thereof being positioned predetermined distances in advance of the strips to increase the efficiency of the baffling effect of the baffles.

A further object of the invention is to provide power means for the shaft preferably in the form of a fluid-operated motor directly connected axially to the shaft to drive it and connectable to a source of fluid under pressure to operate the motor.

Still another object of the invention is to provide baffle members in the form of rigid segmental planar plates which flare outwardly similarly from said shaft and thereby enhance the efficiency of the baffle function of said plates.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 3 is a partly fragmentary vertical sectional view shown on the line 3—3 of FIG. 2 illustrating on a larger scale than in FIG. 2 the relationship of the cooperating elements of the cleaning means shown in said figures.

FIG. 4 is a fragmentary vertical elevation of the mechanism shown in FIG. 3 as seen on the line 4—4 thereof.

DETAILED DESCRIPTION OF THE PREFERRED EMBODIMENT

Figure 1:
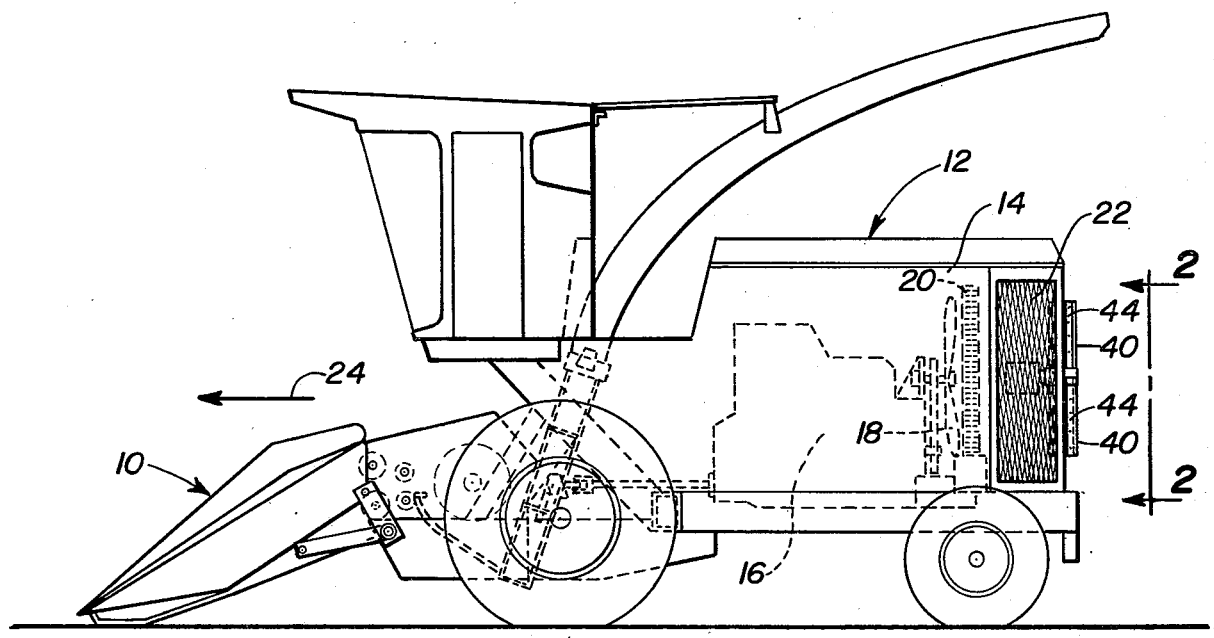
FIG. 1 is a side elevation of an exemplary agricultural implement operated by a water-cooled engine, illustrated in phantom, and showing cleaning means for a radiator screen embodying the principles of the present invention.

Referring to FIG. 1, there is illustrated therein an exemplary side elevation of an exemplary agricultural implement of the mobile type having on the left-hand end thereof a header 10 arranged to engage agricultural crop material and the opposite end of implement 12 comprises a housing 14 in which a water-cooled engine 16 is shown in phantom. Also in phantom there is illustrated an air-intake fan 18 and a radiator 20 through which cooling water for the engine is circulated, the water being cooled by air drawn therethrough by the fan 18 that is conventional in many types of motor vehicles and other agricultural implements.

Implements of the type to which the present invention pertains are frequently operated in environments such as harvest fields in which debris such as chaff, leaves and dust is frequently prevalent and is susceptible to being lodged in the relatively small air passages of the radiators which results in clogging the same and minimizing the efficiency of the cooling effect by operation of the fan 18. The present invention minimizes or prevents the accumulation of debris which otherwise would tend to clog the radiator 20.

Figure 2:
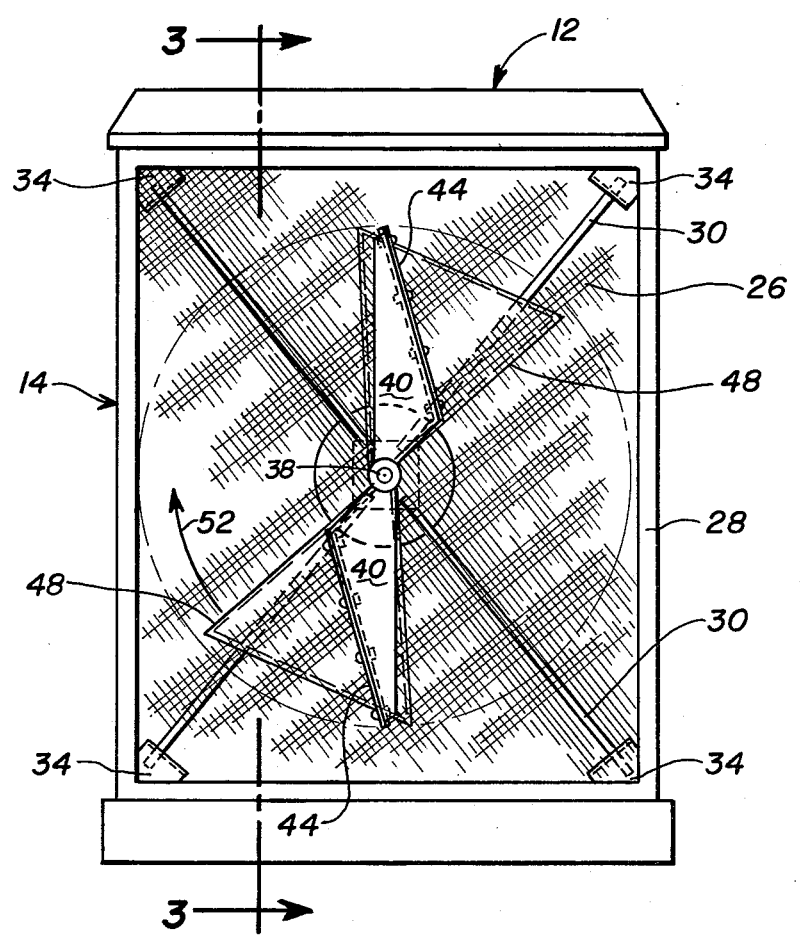
FIG. 2 is a vertical elevation of the air intake face of the housing and radiator for the engine shown in FIG. 1, as seen on the line 2—2 of FIG. 1 and illustrates on a larger scale than used in FIG. 1.

Although radiator cleaning means and the mechanism to prevent the clogging of radiators have been studied and certain solutions to the problem have been devices heretofore, the present invention employs a relatively simple mechanism which consumes a minimal amount of power to effect operation thereof and consists, in its preferred embodiment, of a cage-like arrangement 22 rearward of the radiator 20 with respect to the direction of travel of the implement as indicated by the arrow 24. The sides of the cage-like arrangement 22 include air-inlet screens and the rearmost wall of housing 14 comprises a screen 26 of relatively fine mesh, as shown by FIG. 2, which is rigid and supported at the edges thereof by an enclosing frame 28. The purpose of the screen 26 is to prevent passage of as much debris in the atmosphere as possible and prevent the fan 18 from drawing it into the air passages of the radiator 20. At this operation progresses, however, there is a tendency for debris such as chaff, leaves and dust to accumulate on the outer face of screen 26 and the present invention provides means to clean the screen and maintain it relatively clean during the operation of the implement.

The enclosing frame 28 also has a supporting frame 30 attached thereto in the form of a plurality of rods illustrated in FIG. 2 and also shown in greater detail in FIGS. 3 and 4. The inner ends of the rods 30 are attached to a central plate 32 and the other ends thereof are connected to brackets 34 on enclosing frame 28, see FIG. 2. Connected to the plate 32 is one end of a preferably relatively slow speed motor 36 which, as desired, may be any one of a number of different types such as electric, hydraulic, and chain or belt driven from a suitable sheave on engine 16 for example. The source of power for motor 36 is immaterial as far as the present invention is concerned, but it is necessary to have a motor to rotate a substantially central shaft 38 which extends through the screen 26 as shown in FIG. 3 for purposes of driving at relatively slow speed two different elements described as follows.

The outer end of the shaft 38 supports a pair of relatively narrow somewhat triangular shaped flat arms 40, best shown in FIG. 2, which are parallel to the screen 26 and are sightly spaced from the air-intake face of the screen 26 as shown in FIG. 3. One edge of the arms 40 is bent perpendicularly to the plane of the arms to form a flange 42 to which a preferably flexible strip 44 is renewably secured by small bolts, rivets or otherwise. Also, the strips 44 preferably are provided with short slots 46 through which the bolts or screws extend for purposes of permitting adjustment of the edge of the strips 44 which are nearest the screen 26 to be brought into wiping or scraping relationship with the intake face of the screen but preferably in a yielding manner. From this it will be seen that the strips 44 comprise dislodging means for engaging any accumulation of debris or other particles from the intake face of the screen.

While the dislodging effect of the strips 44 is effective in operation to engage and wipe the accumulated particles from the intake face of the screen, it is to be seen that the cooling fan 18 for the radiator 20 is meanwhile sucking air toward the radiator and such air comes through the screen 26 while the wiping or scraping effect of the strips 44 is occurring and, in the absence of any other means, the dislodging effect of the strips 44 would not be highly effective.

To render the dislodging effect of the strips 44 highly effective, however, the present invention provides baffle members 48 which, as best seen in FIGS. 2 and 4, are triangular in shape and flare outwardly from the shaft 38 to which they are securely affixed and extend in opposite directions from each other as clearly shown in FIGS. 2–4. Baffle members 48 are preferably formed of sheet metal and are parallel to the screen 26. Also, the edges preferably are provided with flanges 50 to strengthen and rigidify the baffle members. From FIGS. 2 and 4, it also will be seen that the baffle members 48 which are adjacent the air discharge face of screen 26, see FIG. 3, are directly opposite the flat arms 40 upon which the strips 44 are supported and the relationship of the baffle members with respect to the particle dislodging means comprising the arms 40 and flexible strips 44 is such that, as the scraping effect of the strips 44 occurs, the baffle member which is opposite each strip neutralizes the suction effect of the cooling fan 18 so that when dislodging of the particles from the screen 26 has occurred by means of the strips 44, the dislodged material is free to fall by gravity from the screen 26 in a highly efficient manner.

It also will be seen from FIGS. 2 and 4 that the flanges 42 of the flat arms 40, while opposite each other with respect to the shaft 38, nevertheless are offset at the inner ends 42a thereof from each other with respect to shaft 38 so that the inner ends 44a of the strips 44 move in advance of the outer ends 44b of the strips 44 as the arms 40 rotate in the direction of the arrows 52. This causes debris accumulating on the screen 26 to be pushed outwardly away from the center of the screen 26. Also, the leading portions of the baffle members 48 move in advance of the strips 44 during rotation of the arms 40 and the baffle members 48 in the direction of arrows 52. The particular arrangement of the arms 40, strips 44 and baffle members 48 shown in FIGS. 2 and 4 is an important advantage of the present invention which makes it very effective for keeping the screen 26 clean.

From the foregoing, it will be seen that the present invention provides a relatively simple but highly effective means for maintaining in relatively clean condition a screen such as the type of screen mounted exteriorally of the radiator of a water-cooled engine on an implement such as an agricultural harvesting machine. The preferred embodiment of the invention provides means for neutralizing the effect of the cooling fan for the radiator incident to a slowly rotating scraper or dislodging means moving over the air-intake face of a screen mounted outwardly from the radiator of the implement. The neutralizing means includes baffle means which move simultaneously with the scraping or dislodging means and effectively neutralizes the suction effect produced by the cooling fan and thereby permits dislodged debris to fall by gravity from the screen in a manner substantially unaffected by the suction effect of the cooling fan for the radiator.

In the foregoing description, the dust dislodging means have been referred to as strips 44, it is to be understood that they serve somewhat as brushes or scrapers and hence, can be described accurately as such in certain instances.

The foregoing description illustrated preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In combination with a screen of planar configuration having an air-intake side and an air-discharge side, cleaning means for said screen comprising:
    (a) a frame supporting said screen;
    (b) a shaft supported by said frame and extending through said screen for rotation relative to said screen;
    (c) a sweep arm connected to said shaft and disposed on said air-intake side of said screen;
    (d) a baffle member connected to said shaft and disposed on said air-discharge side of said screen opposite said sweep arm;
    (e) means to rotate said shaft causing said sweep arm and said baffle member to rotate together so that said baffle member blocks off successive portions of said screen on said air-discharge side to thereby permit said sweep arm to sweep debris from said air-intake side of said screen; and
    (f) a flexible member mounted on said sweep arm in wiping engagement with said air-intake side of said screen, said flexible member having an inner end and an outer end with said inner end being located closer to said shaft than said outer end, and said flexible member being arranged so that said inner end moves in advance of said outer end during rotation of said sweep arm thereby causing debris accumulating on said air-intake side of said screen to be pushed outwardly in a direction away from said shaft.

2. The combination according to claim 1, further comprising a second sweep arm connected to said shaft and extending generally radially therefrom in a direction substantially opposite to said first mentioned sweep arm, and a second baffle member connected to said shaft and extending generally radially therefrom in a direction substantially opposite to said first mentioned baffle member.

3. The combination according to claim 1, wherein said baffle member has a leading portion which moves in advance of said flexible member as said sweep arm and said baffle member rotate together.

* * * * *